US009342463B2

(12) United States Patent
Ash et al.

(10) Patent No.: US 9,342,463 B2
(45) Date of Patent: *May 17, 2016

(54) MANAGEMENT OF DESTAGE TASKS WITH LARGE NUMBER OF RANKS

(71) Applicant: INTERNATIONAL BUSINESS MACHINES CORPORATION, Armonk, NY (US)

(72) Inventors: Kevin J. Ash, Tucson, AZ (US); Michael T. Benhase, Tucson, AZ (US); Lokesh M. Gupta, Tucson, AZ (US); Kenneth W. Todd, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/623,624

(22) Filed: Sep. 20, 2012

(65) Prior Publication Data

US 2014/0082303 A1    Mar. 20, 2014

(51) Int. Cl.
*G06F 12/00* (2006.01)
*G06F 12/12* (2016.01)
*G06F 3/06* (2006.01)
*G06F 13/00* (2006.01)

(52) U.S. Cl.
CPC ........ *G06F 12/12* (2013.01); *G06F 3/06* (2013.01); *G06F 3/061* (2013.01); *G06F 3/0659* (2013.01); *G06F 3/0689* (2013.01); *G06F 13/00* (2013.01)

(58) Field of Classification Search
CPC . G06F 12/00; G06F 2212/202; G06F 3/0689; G06F 12/121; G06F 2212/1016; G06F 12/0893; G06F 2003/0697; G06F 3/0631; G06F 12/084; G06F 12/0871; G06F 12/12; G06F 2201/87; G06F 2212/604; G06F 3/061; G06F 3/06; G06F 13/00; G06F 3/0659
See application file for complete search history.

(56) References Cited

U.S. PATENT DOCUMENTS 6,092,149 A  *  7/2000  Hicken et al. ............... 711/113
7,500,050 B2 *  3/2009  Gill et al. .................... 711/113
7,783,839 B2 *  8/2010  Gill et al. .................... 711/143

(Continued)

FOREIGN PATENT DOCUMENTS

EP    0690379 A2    3/1996
EP    1857918 A2    2/2006

(Continued)

OTHER PUBLICATIONS

Menon, Jai and Cortney, "The Architecture of a Fault-Tolerant Cached RAID Controller", 1993.

(Continued)

*Primary Examiner* — Adam M Queler
*Assistant Examiner* — Alex Olson
(74) *Attorney, Agent, or Firm* — Griffiths & Seaton PLLC

(57) ABSTRACT

A processor, operable in a computing storage environment, for each rank in a storage management device in the computing storage environment, allocates a lower maximum count, and a higher maximum count, of Task Control Blocks (TCBs) to be implemented for performing a storage operation, and performs the storage operation using up to the lower maximum count of TCBs, yet only allows those TCBs above the lower maximum count to be allocated for performing the storage operation satisfying at least one criterion.

12 Claims, 4 Drawing Sheets

(56) References Cited

U.S. PATENT DOCUMENTS

| | | |
|---|---|---|
| 8,127,084 B2 * | 2/2012 | Gill et al. .................... 711/143 |
| 8,479,204 B1 * | 7/2013 | Labonte et al. .............. 718/101 |
| 2003/0105928 A1 * | 6/2003 | Ash et al. .................... 711/136 |
| 2004/0255026 A1 * | 12/2004 | Blount et al. ................ 709/226 |
| 2006/0294301 A1 * | 12/2006 | Zohar et al. ................. 711/113 |
| 2008/0168220 A1 * | 7/2008 | Gill et al. .................... 711/113 |
| 2008/0168234 A1 * | 7/2008 | Gill .................. G06F 12/0804 711/134 |
| 2009/0222621 A1 * | 9/2009 | Ash et al. .................... 711/112 |
| 2011/0191534 A1 * | 8/2011 | Ash et al. .................... 711/113 |
| 2012/0047511 A1 * | 2/2012 | Grusy et al. ................. 718/104 |
| 2012/0151148 A1 * | 6/2012 | Beardsley et al. ........... 711/129 |
| 2014/0040556 A1 * | 2/2014 | Walker ......................... 711/130 |

FOREIGN PATENT DOCUMENTS

| | | | | |
|---|---|---|---|---|
| JP | 2003216491 A | * | 7/2003 | ............. G06F 12/08 |
| JP | 2004062344 A | * | 2/2004 | ............. G06F 3/06 |

OTHER PUBLICATIONS

Gill, Binny S. and Modha, Dharmendra S., "WOW: Wise Ordering for Writes—Combining Spatial and Temporal Locality in Non-Volatile Caches."

Gill, Binny S. et al., "STOW: A Spatially and Temporally Optimized Write Caching Algorithm."

Li, Dong, "High Performance Energy Efficient File Storage System."

* cited by examiner

# US 9,342,463 B2

MANAGEMENT OF DESTAGE TASKS WITH LARGE NUMBER OF RANKS

BACKGROUND OF THE INVENTION

1. Field of the Invention

The present invention relates in general computing systems, and more particularly to systems for increased data management efficiency in computing storage environments.

2. Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

A storage management device (e.g., storage controller) in a computer storage system has a limited number of Task Control Blocks (TCBs). In one such storage controller, the number of such TCBs may be 8000 (8K). In contrast the same storage controller may have a larger relative number of available ranks. In the instant example, the storage controller may have 400. An individual rank has a maximum number of destage TCBs (TCBs dedicated to executing destage operations in the storage environment) running to destage modified data in Non Volatile Storage (NVS). In the present example, such maximum number of destage TCBs may be 40.

In view of such a scenario, if each rank is using its maximum number of destage TCBs, then the storage controller may run out of free TCBs (e.g., 40*400=16000>8K), or have very few destage TCBs to be used for other tasks in the storage controller (for example if many ranks are near their maximum TCBs).

One possible solution is to cap the maximum destage TCBs for every rank to a lower number, such that every rank can have maximum destage TCBs and still the total will not exceed a threshold. This solution results in a scenario, however, where no rank may be using maximum destage TCBs, and the ranks that should use maximum destage TCBs will be running with fewer destage TCBs, and hence the throughput on the ranks, and overall system performance may suffer. A need exists to better manage destage tasks in a storage management device having a large number of ranks.

Accordingly, and in view of the foregoing, various embodiments for data management in a computing storage environment are provided. In one embodiment, by way of example only, a method of data management by a processor device in a computing storage environment is provided. For each rank in a storage management device of the computing storage environment, a lower maximum count, and a higher maximum count, of Task Control Blocks (TCBs) are allocated to be implemented for performing a storage operation, and the storage operation using up to the lower maximum count of TCBs, yet only allowing those TCBs above the lower maximum count to be allocated for performing the storage operation satisfying at least one criterion.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, a storage management device (e.g., storage controller) in a computer storage system has a limited number of Task Control Blocks (TCBs). In one such storage controller, the number of such TCBs may be 8000 (8K). In contrast the same storage controller may have a larger relative number of available ranks. In the instant example, the storage controller may have 400. An individual rank has a maximum number of destage TCBs (TCBs dedicated to executing destage operations in the storage environment) running to destage modified data in Non Volatile Storage (NVS). In the present example, such maximum number of destage TCBs may be 40.

In view of such a scenario, if each rank is using its maximum number of destage TCBs, then the storage controller may run out of free TCBs (e.g., 40*400=16000>8K), or have very few destage TCBs to be used for other tasks in the storage controller (for example if many ranks are near their maximum TCBs).

One possible solution is to cap the maximum destage TCBs for every rank to a lower number, such that every rank can have maximum destage TCBs and still the total will not exceed a threshold. This solution results in a scenario, however, where no rank may be using maximum destage TCBs, and the ranks that should use maximum destage TCBs will be running with fewer destage TCBs, and hence the throughput on the ranks, and overall system performance may suffer. A need exists to better manage destage tasks in a storage management device having a large number of ranks.

The mechanisms of the illustrated embodiments serve to address this need by, for example, using two counts of TCBs that may be used for destage operations. These two counts include (a), a lower maximum destage count that can be used for destage operations (e.g., 4K), and (b), a higher maximum destage count that can be used for destage operations (e.g., 5K).

In this way, each rank, in one exemplary embodiment, may have two "maxes" for destage TCBs: (a), a lower max, which may be defined, in one embodiment, as the lower maximum destage TCBs for the storage management device divided by the number of available ranks, and (b), an absolute max a particular rank may use, which may be defined, again in one embodiment, as a predetermined value (e.g., 40).

According to the mechanisms of the illustrated embodiments, a rank may be allowed to allocate up to the lower maximum destage TCB value at any time, but is only allowed allocations above the lower maximum destage TCB value if the total destage TCBs allocated above the lower max value for all available ranks is lower than a certain criterion (e.g., in one embodiment, using the formula: Higher maximum destage TCBs for the storage management device—Lower maximum destage TCBs for the storage management device).

Figure 1:
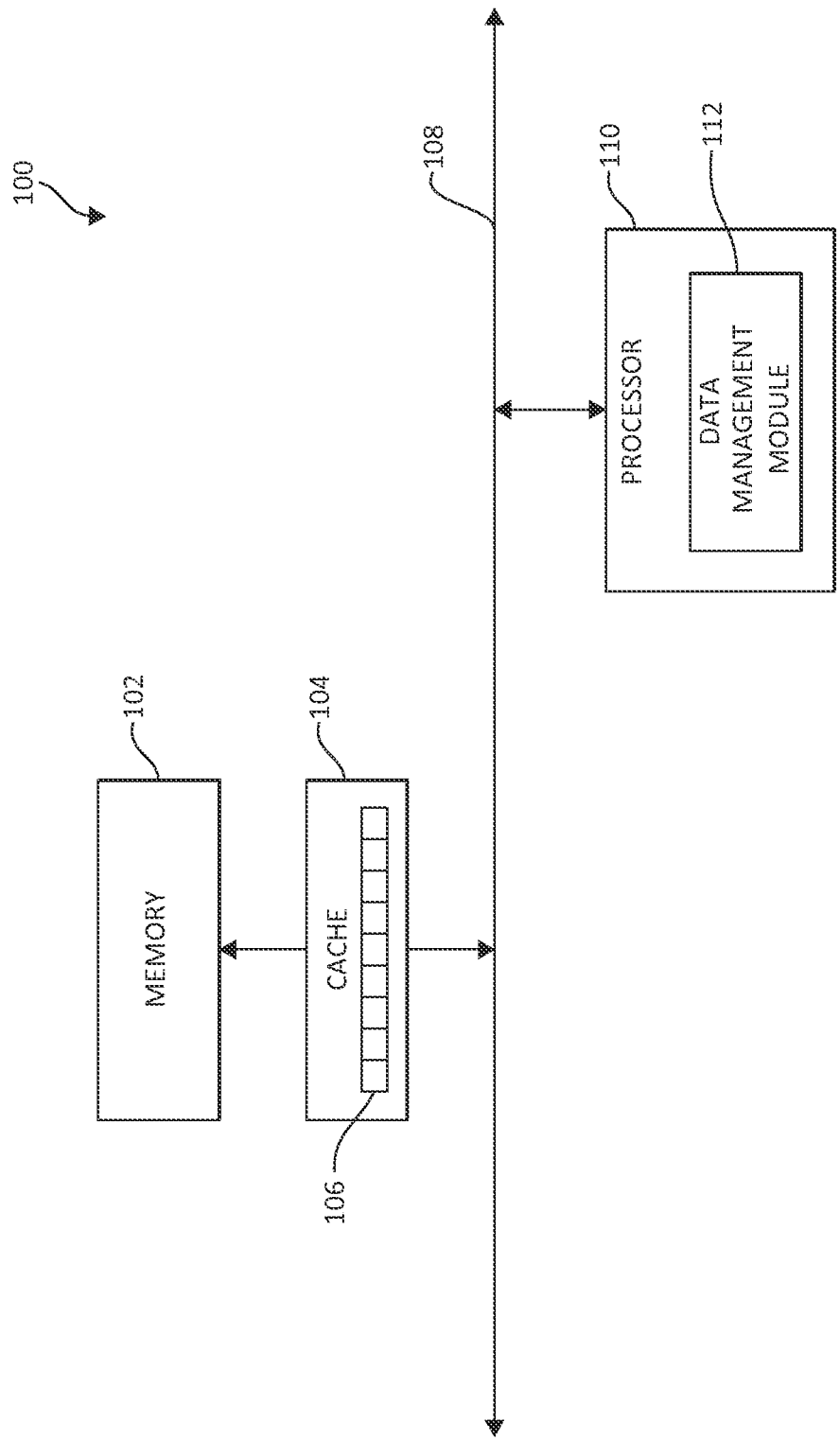
FIG. 1 is an exemplary block diagram showing a hardware structure for cache management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a cache management module 112, which comprises computer-readable code that, when executed by processor 110, causes processor 110 to perform data management operations in accordance with aspects of the illustrated embodiments. In the various embodiments, processor 110, for each rank in the storage management device, allocates a lower maximum count, and a higher maximum count, of Task Control Blocks (TCBs) to be implemented for performing a storage operation, and performs the storage operation using up to the lower maximum count of TCBs, yet only allows those TCBs above the lower maximum count to be allocated for performing the storage operation satisfying at least one criterion.

In various other embodiments, processor 110 considers the at least one criterion for one of the TCBs.

In various other embodiments, processor 110, pursuant to considering the at least one criterion, considers whether a total number of TCBs presently allocated above the lower maximum count is lower than a total higher maximum count of TCBs for the storage management device minus a total lower maximum count of TCBs for the storage management device.

In various other embodiments, processor 110, pursuant to performing the storage operation, performs a destage operation.

In various other embodiments, processor 110 establishes the lower maximum count as a function of a total TCB for all ranks in the storage management device and a total number of ranks in the storage management device.

In various other embodiments, processor 110, based on an amount of modified data in cache, determines a number of TCBs needed for a particular rank of the storage management device.

In various other embodiments, processor 110 determines, based on the determined TCBs needed for the particular rank, a number of actual TCBs to be allocated in view of the allocated lower and higher maximum amounts.

Figure 2:
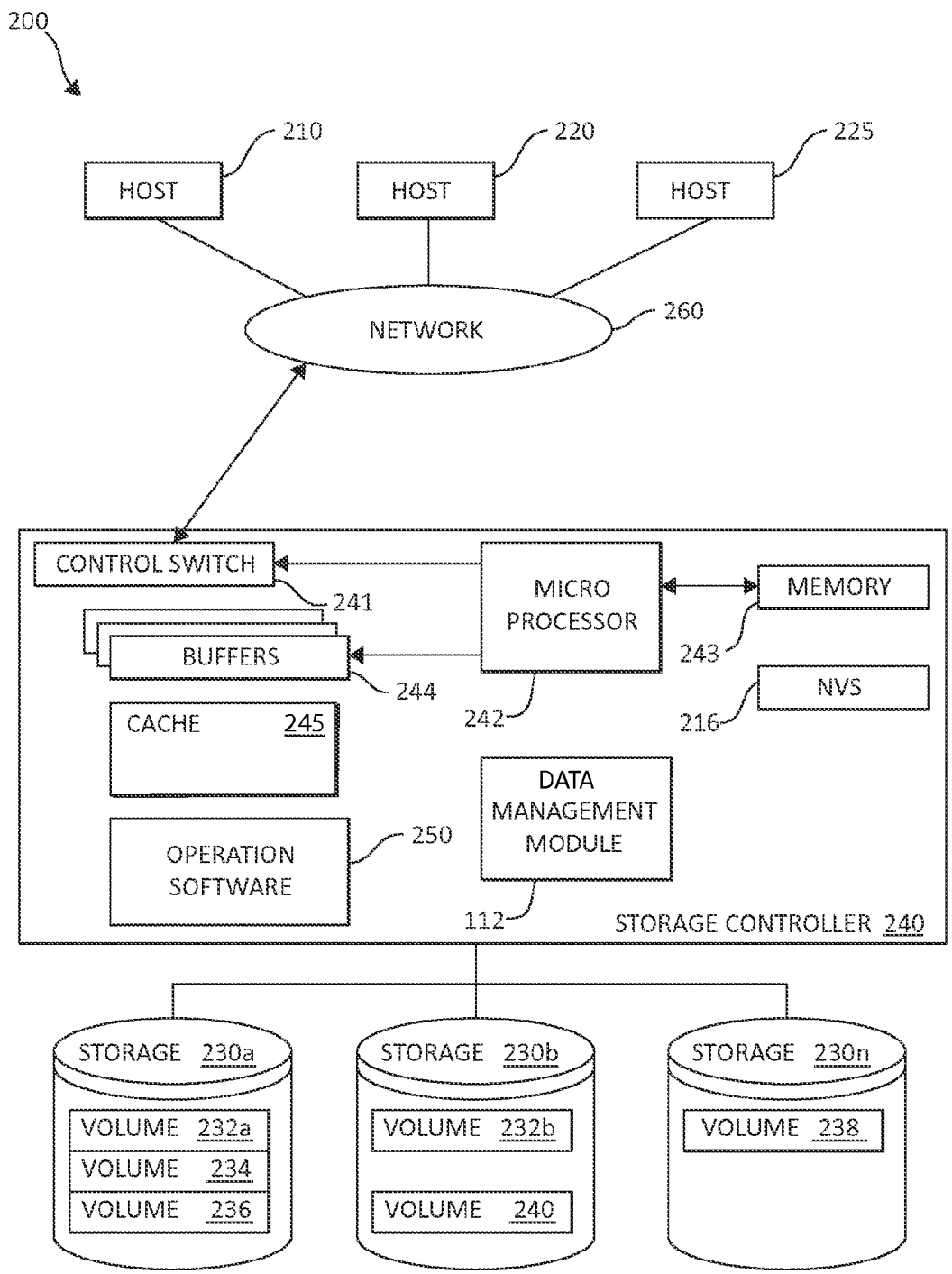
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a data management module 112. The data management module 112 may incorporate internal memory (not shown) in which the destaging algorithm may store unprocessed, processed, or "semi-processed" data. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 110, in which information may be set. The multiple buffers 244 may be implemented to assist with the methods and steps as described herein.

Cache 245, in combination with data management module 112, may perform various aspects of the present invention as will be further described, such as establishing two counts of TCBs to be allocated and appropriate allocation rules as will be further described.

One of the exemplary mechanisms of the illustrated embodiments concerns establishing A) First threshold (any rank can allocate at any time) and b) Second threshold counts (a cap no rank can ever exceed). The delta between the First and Second thresholds is controlled to prevent too many ranks from allocating too many TCBs. A rank can only allocate above the First threshold, if the number of TCBs (across all ranks) above the First threshold is under a fixed limit. For example, 200 ranks could allocate 15 TCBs, i.e. 10 from the first threshold and 5 from the second (200*5=1K) or 50 ranks could allocate 30 TCBs (the first 10 plus a second 20, 50*20=1K). In additional to the foregoing, any number of combinations known to one of ordinary skill may be implemented.

The absolute maximum number of TCBs that can ever be allocated is equal to the number of ranks times the first threshold (i.e. 400*10=4K) plus the fixed limit (1 k) for a total of 5K.

Figure 3:
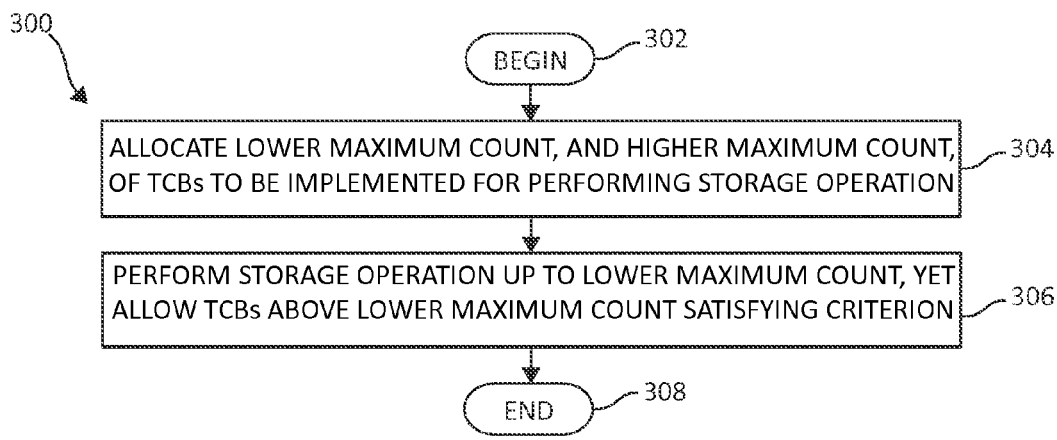
FIG. 3 is a flow chart diagram illustrating an exemplary method for increased efficiency managing destage tasks in a storage management device having a large number of ranks, again in which aspects of the present invention may be realized.

Turning now to FIG. 3, a flow chart diagram, illustrating a generalized method method 300 for cache/data management in accordance with the present invention, is depicted. Method 300 begins (step 302). A lower maximum count, and a higher maximum count of TCBs are each allocated, and set aside to be implemented for performing a storage operation (step 304). The storage operation is subsequently performed, where the allocated TCBs are used up to the lower maximum count, and only those satisfying a predetermined criterion are allowed above the lower maximum count (step 306). The method 300 then ends (step 308).

Figure 4:
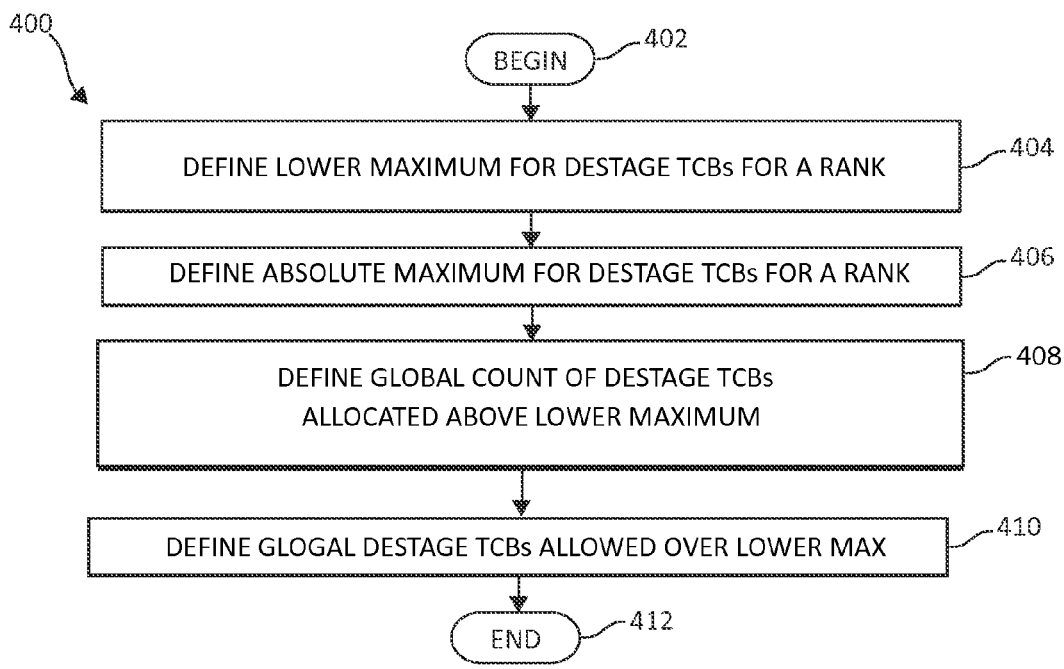
FIG. 4 is an additional flow chart diagram illustrating an exemplary method for configuring various operations for data management enhancement, again in which aspects of the present invention may be implemented.

Turning now to FIG. 4, an additional flow chart diagram of exemplary configuration operations in which aspects of the illustrated embodiments are incorporated, is depicted. Method 400 begins (step 402) by defining a lower maximum for destage TCBs for a rank (step 404). In one embodiment, this value is the lower max of destage TCBs a rank may have for destage operations. It may be computed, in one embodiment, as follows: (Lower Max Destages for All Ranks in the Storage Management Device/Number of Ranks)

In step 406, an absolute maximum for destage TCBs for a rank is defined. In one embodiment, this refers to the absolute maximum destage TCBs that can be allocated to a rank. In step 408, following, a global count of destage TCBs allocated above the lower maximum count is defined. This refers, in one embodiment, to the global count of destage TCBs that are allocated above the lower maximum for all ranks in the storage management device. In step 410, following, a global count of destage TCBs allowed over the lower maximum is defined. In one embodiment, this refers to the global count of destage TCBs that is allowed over the lower maximum count. The method 400 then ends (step 412).

Figure 5:
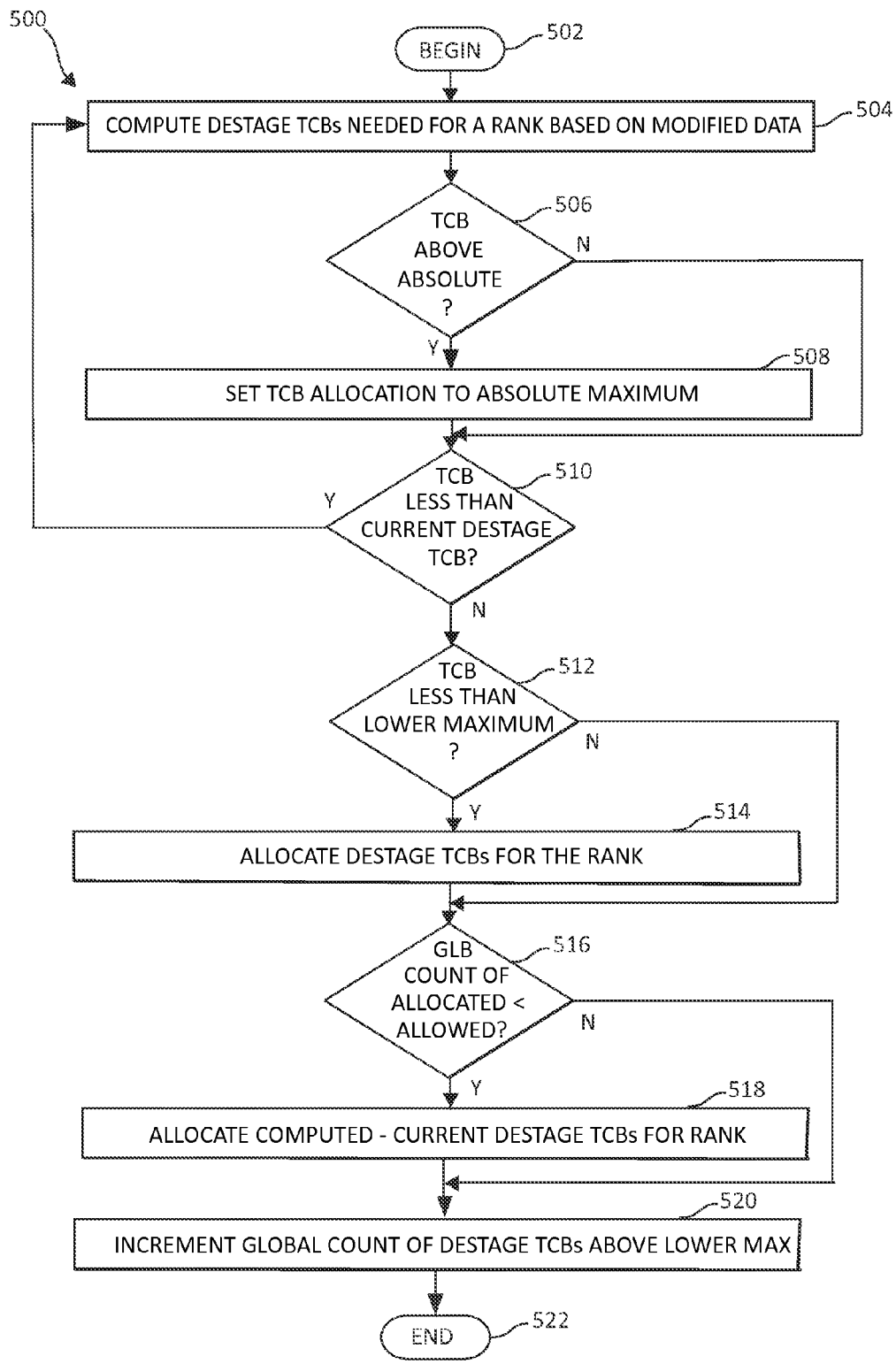
FIG. 5 is an additional flow chart diagram of an exemplary destage TCB allocation for a rank, in accordance with the mechanisms of the illustrated embodiments.

FIG. 5, following, is an additional flow chart diagram of an exemplary destage TCB operation for a particular rank, shown as method 500, here again in which aspects of the illustrated embodiments may be implemented. Method 500 begins (step 502), with the computation of the destage TCBs needed for the rank based on modified data in Cache (step 504). If the computed destage TCB value is greater than the absolute value as previously defined in method 400 (step 506), then the TCB allocation is set to the absolute maximum (step 508). If not, the method 500 continues to step 510, which queries if the computed destage TCBs is less than the current destage TCBs for the rank. If this is the case, then the method 500 returns to step 504 as shown. If not, the method 500 continues to step 512, which queries if the computed destage TCBs needed is below the lower maximum destages for a rank.

If the answer to the query in step 512 is affirmative, then destage TCBs for the rank are allocated (step 514). In one embodiment this may be performed according to (allocate computed—current destage TCBs). Alternatively, method 512 moves to step 516, which queries if the global count of destage TCBs allocated above the lower maximum is less than the global destage TCBs allowed over the lower maximum value. If this is the case, then computed—current destage TCBs are allocated for the rank (step 518), and the global count of destage TCBs allocated above the lower max is incremented by the amount of destage TCBs newly allocated for the rank over the lower maximum (step 520). Returning to step 516, if the query returns negative, the method 500 moves to step 520 as previously described. The method 500 then ends (step 522).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A system for data management in a computing storage environment, comprising:
   a processor device; and
   a storage management device in operable communication with the processor device, wherein the processor device, for each rank in the storage management device:
      allocates a lower maximum count defined by a predetermined lower maximum count of Task Control Blocks (TCBs) of a rank for performing destage operations, and a higher maximum count, of TCBs to be implemented for performing a storage operation,
      performs the storage operation using up to the lower maximum count of TCBs, yet only allows those TCBs above the lower maximum count to be allocated for performing the storage operation satisfying at least one criterion, and based on an amount of modified data in cache, determines a number of TCBs needed for a particular rank of the storage management device.

2. The system of claim 1, wherein the processor device considers at least one criterion for one of the TCBs.

3. The system of claim 2, wherein the processor device, pursuant to considering at least one criterion, considers whether a total number of TCBs presently allocated above the lower maximum count is lower than a total higher maximum count of TCBs for the storage management device minus a total lower maximum count of TCBs for the storage management device.

4. The system of claim 1, wherein the processor device, pursuant to performing the storage operation, performs a destage operation.

5. The system of claim 1, wherein the processor device establishes the lower maximum count as a function of a total TCB for all ranks in the storage management device and a total number of ranks in the storage management device.

6. The system of claim 1, wherein the processor device determines, based on the determined TCBs needed for the particular rank, a number of actual TCBs to be allocated in view of the allocated lower and higher maximum amounts.

7. A computer program product for data management in a computing environment by a processor device, the computer program product comprising a non-transitory computer-readable storage medium having computer-readable program code portions stored therein, the computer-readable program code portions comprising:

a first executable portion that, for each rank in the storage management device:

allocates a lower maximum count defined by a predetermined lower maximum count of Task Control Blocks (TCBs) of a rank for performing destage operations, and a higher maximum count, of TCBs to be implemented for performing a storage operation, performs the storage operation using up to the lower maximum count of TCBs, yet only allows those TCBs above the lower maximum count to be allocated for performing the storage operation satisfying at least one criterion, and based on an amount of modified data in cache, determines a number of TCBs needed for a particular rank of the storage management device.

8. The computer program product of claim 7, further including a second executable portion that considers at least one criterion for one of the TCBs.

9. The computer program product of claim 8, further including a third executable portion that, pursuant to considering at least one criterion, considers whether a total number of TCBs presently allocated above the lower maximum count is lower than a total higher maximum count of TCBs for the storage management device minus a total lower maximum count of TCBs for the storage management device.

10. The computer program product of claim 7, further including a second executable portion that, pursuant to performing the storage operation, performs a destage operation.

11. The computer program product of claim 7, further including a second executable portion that establishes the lower maximum count as a function of a total TCB for all ranks in the storage management device and a total number of ranks in the storage management device.

12. The computer program product of claim 7, further including a second executable portion that determines, based on the determined TCBs needed for the particular rank, a number of actual TCBs to be allocated in view of the allocated lower and higher maximum amounts.

* * * * *